US008902328B2

(12) United States Patent
Vidal-Naquet

(10) Patent No.: US 8,902,328 B2
(45) Date of Patent: Dec. 2, 2014

(54) METHOD OF SELECTING A SUBSET FROM AN IMAGE SET FOR GENERATING HIGH DYNAMIC RANGE IMAGE

(71) Applicant: Michel Julien Vidal-Naquet, San Mateo, CA (US)

(72) Inventor: Michel Julien Vidal-Naquet, San Mateo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 91 days.

(21) Appl. No.: 13/828,757

(22) Filed: Mar. 14, 2013

(65) Prior Publication Data
US 2014/0267883 A1 Sep. 18, 2014

(51) Int. Cl.
H04N 5/228 (2006.01)
H04N 5/235 (2006.01)
G03B 7/00 (2014.01)
G06T 5/00 (2006.01)

(52) U.S. Cl.
CPC ........................................ *G06T 5/00* (2013.01)
USPC ...................... 348/222.1; 348/229.1; 348/362

(58) Field of Classification Search
CPC . H04N 5/235; H04N 5/23232; H04N 5/2355; H04N 5/35536
USPC .................................. 348/222.1, 229.1, 362
See application file for complete search history.

(56) References Cited

U.S. PATENT DOCUMENTS

| 7,626,614 | B1* | 12/2009 | Marcu | 348/222.1 |
|---|---|---|---|---|
| 2010/0053370 | A1* | 3/2010 | Crisan et al. | 348/231.2 |
| 2010/0295962 | A1* | 11/2010 | Terauchi | 348/222.1 |
| 2011/0211040 | A1* | 9/2011 | Lindemann et al. | 348/36 |
| 2011/0211732 | A1* | 9/2011 | Rapaport | 382/107 |
| 2011/0254976 | A1* | 10/2011 | Garten | 348/229.1 |
| 2012/0002890 | A1* | 1/2012 | Mathew | 382/232 |
| 2012/0002899 | A1* | 1/2012 | Orr et al. | 382/282 |
| 2012/0314103 | A1* | 12/2012 | Majewicz et al. | 348/239 |
| 2013/0028509 | A1* | 1/2013 | Moon et al. | 382/162 |
| 2013/0100314 | A1* | 4/2013 | Li et al. | 348/229.1 |
| 2013/0120607 | A1* | 5/2013 | Manabe | 348/223.1 |
| 2013/0223690 | A1* | 8/2013 | Criminisi | 382/106 |
| 2013/0235072 | A1* | 9/2013 | Longhurst et al. | 345/605 |
| 2013/0242177 | A1* | 9/2013 | Whitham | 348/367 |
| 2013/0250113 | A1* | 9/2013 | Bechtel et al. | 348/148 |
| 2013/0314568 | A1* | 11/2013 | Vranceanu et al. | 348/239 |
| 2013/0329004 | A1* | 12/2013 | Baqai et al. | 348/36 |
| 2013/0329092 | A1* | 12/2013 | Wong | 348/241 |
| 2013/0335555 | A1* | 12/2013 | Demandolx et al. | 348/135 |

(Continued)

FOREIGN PATENT DOCUMENTS

JP 2010278890 12/2010

*Primary Examiner* — Chia-Wei A Chen
(74) *Attorney, Agent, or Firm* — Chen Yoshimura LLP

(57) ABSTRACT

A method for selecting an optimum subset of images from a larger set of images for optimal HDR image creation. For each of the set of images, an exposure quality map is computed by assigning, to each pixel of the image, an exposure quality value based on the pixel brightness value of that pixel. A suitable exposure quality function, typically reflecting the properties of the imaging device, is used for this purpose. Then, for each possible subset of images, the exposure quality maps for the images in the subset are combined using a max operation to generate a combined exposure quality map for the subset. An average pixel value of the combined exposure quality map of the subset is then calculated and serves as a quality score. The subset of images processing the highest quality score are used to generate the HDR image.

17 Claims, 3 Drawing Sheets

(56) References Cited

U.S. PATENT DOCUMENTS

| | | | |
|---|---|---|---|
| 2014/0064632 A1* | 3/2014 | Manabe | 382/254 |
| 2014/0064634 A1* | 3/2014 | Rempel et al. | 382/274 |
| 2014/0079335 A1* | 3/2014 | Sun | 382/274 |

* cited by examiner

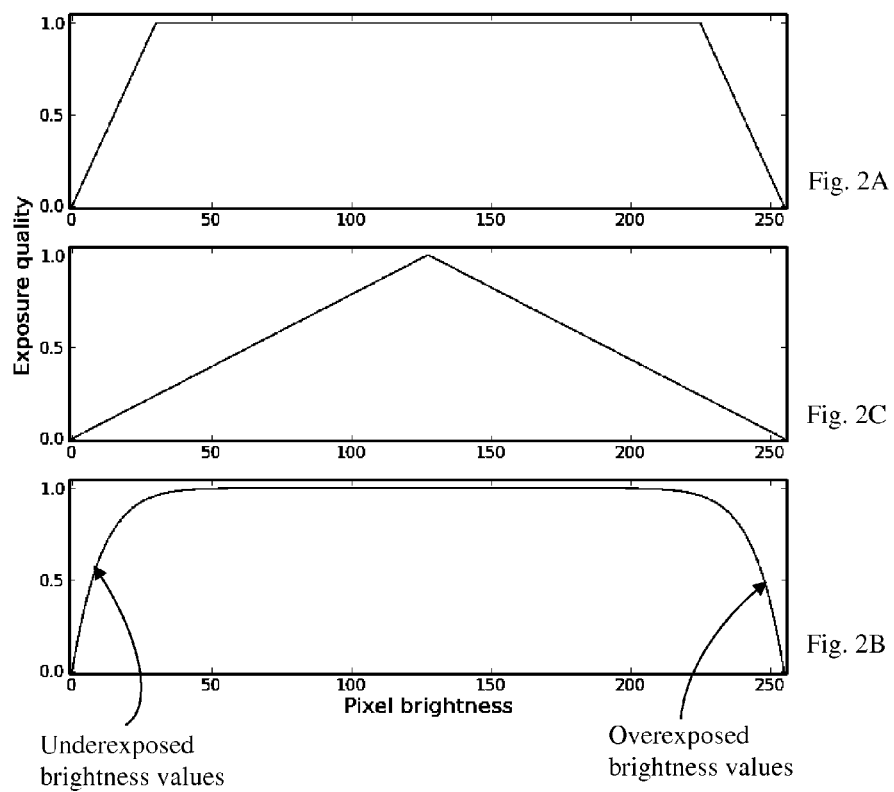
Fig. 2A
Fig. 2C
Fig. 2B
Underexposed brightness values
Overexposed brightness values
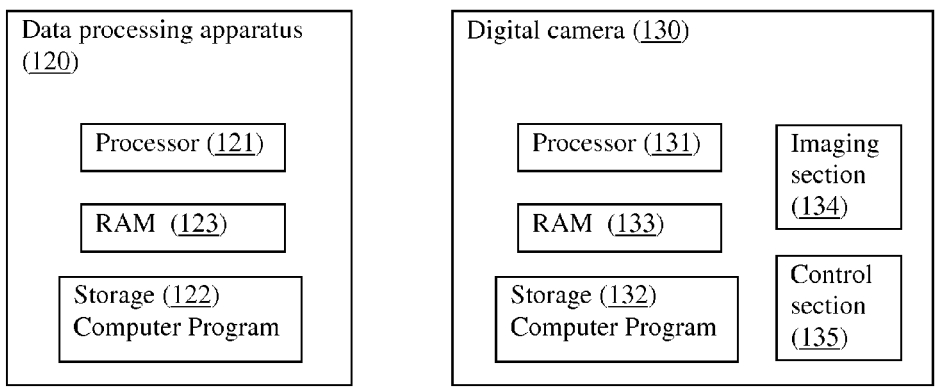
Fig.5A
Fig.5B

METHOD OF SELECTING A SUBSET FROM AN IMAGE SET FOR GENERATING HIGH DYNAMIC RANGE IMAGE

BACKGROUND OF THE INVENTION

1. Field of the Invention

This invention relates to high dynamic range (HDR) imaging, and in particular, it relates to selection of a subset from a set of images of different exposure levels for creating an HDR image.

2. Description of Related Art

High dynamic range (HDR) imaging is a technique used in image processing and digital photography to handle sources that have extremely large ranges of brightness (light intensity). For example, an outdoor scene in daylight may include blue sky and sunlit objects as well as objects in shadows; a night scene may include neon lights and brightly lit objects as well as poorly lit objects; an indoor scene may include bright windows as well as darker areas, etc. These scenes pose a challenge for imaging devices such as digital cameras; the dynamic range of the image sensor of currently available digital cameras often cannot adequately image such scenes. If the exposure level is adequate for capturing details of darker areas of the scene, the brighter areas will often be overexposed with details lost; conversely, if the exposure level is adequate for capturing details of brighter areas of the scene, the darker areas will often be underexposed with details lost.

HDR imaging techniques deal with this problem by taking multiple images of the same scene at various exposure levels, and then digitally merging the multiple images to create an HDR image that contains information from the original multiple images, so that details in both brighter and darker areas are adequately expressed in the HDR image. Methods for creating an HDR image from multiple images are generally known.

Bracketing is a technique in photography for taking multiple images of the same scene using different exposure levels or other different setting values such as focus, depth of field, etc. Some cameras can perform autobracketing, i.e., automatically changing the setting multiple times and take multiple images. Multiple images generated by exposure bracketing can be used to create HDR images.

SUMMARY

Sometimes, exposure bracketing generates a set of a relatively large number of original images of different exposure levels, e.g., seven images. A large set of original images is desirable as it provides more information from which to generate the HDR image. However, as image processing for merging multiple original images is computationally intensive (for example, all images must be aligned correctly which is a computationally intensive process), sometimes it is desirable to use a subset of the entire image set to create the HDR image. When the set is large, using a suitable subset can typically produce satisfactory results because the multiple images in the image set will contain redundant information; for example, the darker areas of the scene may be adequately exposed in two of the higher exposure images of the set, so discarding one of these two images can still produce satisfactory result.

Because different images carry different information (e.g. details for different areas), different subsets of images will typically result in different qualities of the resulting HDR image. Therefore, adequately selecting the subset of images is important. The present invention is directed to a method and related apparatus for automatically selecting an optimum subset of images for HDR image creation.

An object of the present invention is to provide such a method that is fast and delivers optimum results.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a high dynamic range (HDR) image using a set of N images having different exposure levels, the method including: (a) generating, for each of the set of N images, an exposure quality map based on brightness levels of the pixels in the image, wherein the exposure quality map has pixels having exposure quality values calculated from the brightness levels of the pixels of the image; (b) calculating a quality score for each of a plurality of subset of M images of the set of N images, including: (b1) generating a combined exposure quality map from the exposure quality maps corresponding to the M images; and (b2) calculating the quality score from the combined exposure quality map based on the pixel values of the combined exposure quality map; (c) selecting one subset from the plurality of subsets of M images based on the calculated quality scores for the plurality of subsets; and (d) generating an HDR image using the selected subset of M images.

In another aspect, the present invention provides a method for generating a high dynamic range (HDR) image using a set of N images having different exposure levels, the method including: (a) calculating a quality score for each of a plurality of subsets of M images of the set of N images, including: (a1) assigning an exposure quality value to each pixel of each of the M images based on a brightness value of the pixel and an exposure quality function, wherein the exposure quality function maps brightness values within a center brightness range to more favorable exposure quality values, and maps brightness values outside of the center brightness range to less favorable exposure quality values; and (a2) calculating the quality score for each of the plurality of subsets of M images by evaluating the exposure quality value of all pixels of all of the M images in the subset; (b) selecting one subset from the plurality of subsets of M images based on the calculated quality scores for the plurality of subsets; and (c) generating an HDR image using the selected subset of M images.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

In another method, the present invention provides a digital camera which includes: an imaging section for obtaining images; a control section for controlling the imaging section to obtain a set of N images having different exposure levels; and a data processing section executing the above methods.

It is to be understood that both the foregoing general description and the following detailed description are exemplary and explanatory and are intended to provide further explanation of the invention as claimed.

BRIEF DESCRIPTION OF THE DRAWINGS

FIGS. 2A-2C illustrate various exemplary exposure quality functions that can be used in the subset selection method.

FIG. 5A schematically illustrates a data processing apparatus in which embodiments of the present invention may be implemented.

FIG. 5B schematically illustrates a digital camera in which embodiments of the present invention may be implemented.

DETAILED DESCRIPTION OF PREFERRED EMBODIMENTS

Embodiments of the present invention provide a method for automatically selecting an optimum subset of M images from a set of N images (M<N) for use in HDR image creation. The N images in the set are taken of the same scene approximately, even though they may not the aligned exactly, at different exposure levels. The method finds a subset of images that ensures that a maximum number of pixels in the HDR image have good exposure in at least one image, i.e. an image where the pixels is not overexposed or underexposed. This ensures best HDR creation quality. The method uses an algorithm that assesses the quality of all possible subsets of M images, then selects the subset with the highest measured quality.

Figure 1:
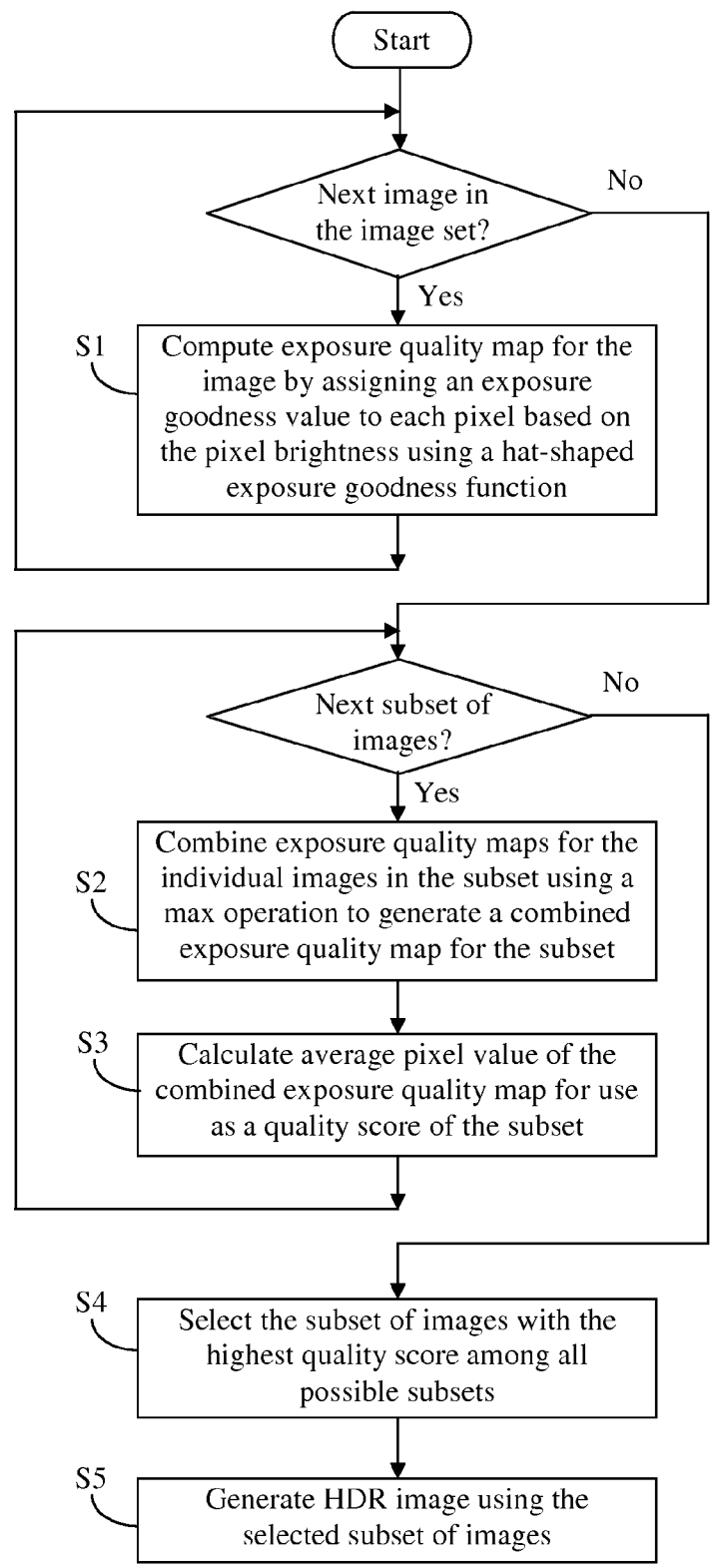
FIG. 1 schematically illustrates a method for selecting an optimum subset of images from a larger set for HDR image creation according to an embodiment of the present invention.

A subset selection method according to an embodiment of the present invention is described in detail with reference to FIG. 1.

The input to the method is a set of N images having identical spatial resolution (i.e. the same numbers of pixels in horizontal and vertical directions). Each pixel in each image has a brightness value. For color images, the brightness value is calculated from the color components. Any suitable method may be used to calculate brightness. For example, an RGB to gray transformation may be used, or the V value from the HSV color values or the Y value from the YCC color values may be used, etc.

In a first step (step S1), which is repeated for each image of the set of N images, an exposure quality map is computed for the image by assigning, to each pixel of the image, an exposure quality value based on the brightness value of that pixel. For this purpose, an exposure quality function is used to map the brightness values to exposure quality values. In some embodiments, the exposure quality function has a hat shape with a flat region, some examples of which are shown in FIGS. 2A and 2B. In these examples, a pixel with a brightness values between a first brightness value and a second brightness value, e.g. between 10% and 90% or between 20% and 80% of the camera's dynamic range, is assigned a first exposure quality value (e.g. 1 in the examples of FIGS. 2A and 2B). The brightness range defined between the first and second brightness values corresponds to a center portion of the camera's response function, and the first exposure quality value represents good exposure. If the brightness value of an image pixel is below the first brightness value or above the second brightness value, the pixel is considered underexposed or overexposed, respectively, and is assigned an exposure quality values that is between the first exposure quality value and a second exposure quality value (e.g. between 1 and 0 in the examples of FIGS. 2A and 2B). The second exposure quality value represents poor exposure. The shape of the exposure quality function in the underexposed and overexposed part of the function may be straight lines (as in the example of FIG. 2A) or curves (as in the example of FIG. 2B).

In the specific examples of FIGS. 2A and 2B, pixels with brightness values below some threshold or above another threshold correspond to under/over exposed pixels, and receive a lower quality value (eg. below one). For example, pixels with brightness below 10% of the maximal camera brightness value (e.g. 255) are considered under exposed and receive a quality value below 1. Similarly, pixels over 90% of the maximal brightness value, also receive a quality value below 1. All pixels with brightness in between are considered well exposed and receive the maximal quality value of 1.

The shape of the exposure quality function is designed to ensure that pixels with good exposure (neither underexposed nor overexposed) are properly designated as good pixels. Generally, the exposure quality function should reflect properties of the imaging device: pixel values corresponding to under or overexposure may vary depending on the device. For example, high quality cameras may have reliable (i.e., not noisy) measurements for pixel values over a much larger brightness range (i.e. lower at the low end and higher at the high end) than for average cameras. This would be reflected in a flatter hat shape of the exposure quality function, i.e., a shape that has a wider range that is flat. An appropriate exposure quality function for a relatively poor quality camera may have a more pointy shape, such as that shown in FIG. 2C in an extreme case.

In practice, any suitable function that reasonably map pixel values (brightness) to some score may be used as the exposure quality function, as long as pixel values located at the two ends of the camera's brightness range, which typically have poor exposure, are generally assigned lower exposure quality values than pixel values in a middle of the camera's brightness range. For example, the exposure quality function may have a convex bow shape, a shape with multiple ascending and then descending steps, etc. Stated more generally, the exposure quality function maps brightness values within some brightness range(s), typically in the center range of the full brightness range, which is generally more reliable for the imaging device, to more favorable exposure quality values, and maps brightness values outside of these range(s), typically above and below the center range, to less favorable exposure quality values. For example, in FIG. 2B, the center range may be from 10% to 90% of the full brightness range and the more favorable exposure quality values may be values above 0.8. The actual numerical values corresponding to the more favorable and less favorable exposure quality values are not important; for example, the most favorable exposure quality value may be 1 and the least favorable value may be 0, or vice versa, etc.

When the method is implemented in a digital camera, the manufacture may set a default exposure quality function for that camera, and may allow the user to select other exposure quality functions. When the method is implemented in a general purpose computer, this function can be selected by the user or selected automatically by the algorithm.

Figure 3:
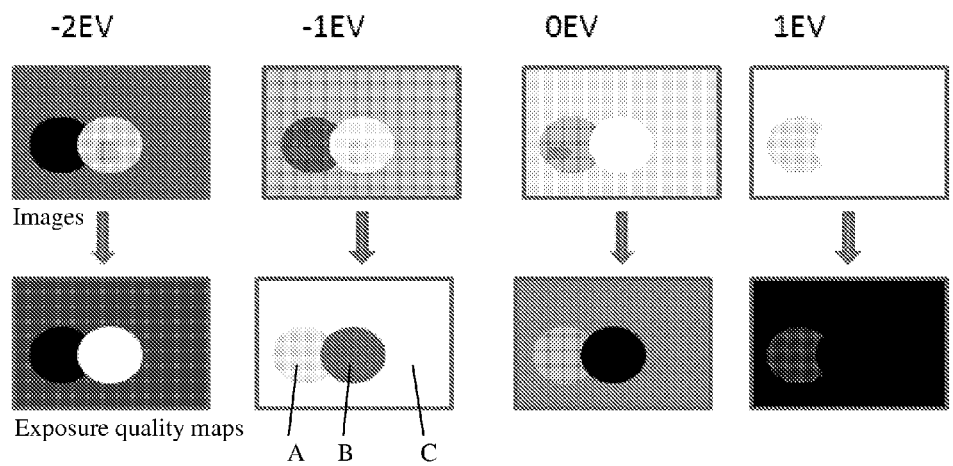
FIG. 3 schematically illustrates examples of images of various exposure levels and corresponding exposure quality maps calculated by a step of the subset selection method.

The result of step S1 is an exposure quality map corresponding to each image. The map has the same spatial resolution as the image itself, and the pixel values of the map are the assigned exposure quality values, which are between the first and second exposure quality values inclusive. Some examples are schematically illustrated in FIG. 3. A hat-shaped exposure quality function such as that shown in FIG. 2A or FIG. 2B is used to generate these examples. It should be noted that these diagrams are highly schematic and are merely used as examples to aid in the understanding. In FIG. 3, four images at exposure levels −2EV, −1EV, 0EV and 1EV are taken of the same scene. The top row in FIG. 3 shows the four images; the bottom row shows the four corresponding exposure quality maps. In these exposure quality maps, exposure quality values closer to the first exposure quality values (e.g. 1, indicating better exposure) are represented by lighter shades.

For convenience of discussion, the scene is roughly considered to have three regions, indicated as A, B and C in FIG. 3. In the −2EV image, region B is properly exposed; region A is severely underexposed, and region C is somewhat underexposed. In the resulting exposure quality map, region B has an exposure quality value approximately equal to the first value (good exposure, shown as white), region A has an exposure quality value close to the second value (poor exposure, shown as black), and region C has an exposure quality value between the first and second values (shown as gray). In the −1EV image, region C is properly exposed; region A is somewhat underexposed, and region B is somewhat overexposed. In the resulting exposure quality map, region C has an exposure quality value approximately equal to the first value, while both region A and region B have exposure quality values between the first and second values. The other images and maps can be understood similarly.

Sometimes, to improve speed, it is desirable to reduce the size of the images before calculating the exposure quality map for each image. Thus, the N images that are subject to step S1 may have already been reduced in size. Alternatively, it is possible to perform size-reduction and to assign exposure quality values in one step, to generate an exposure quality map that has a smaller spatial resolution than the image itself. For example, step S1 may subsample the image at intervals of p and q (e.g. 2 and 2) pixels in the two directions and assign exposure quality values to the selected pixels based on their brightness. Or, step S1 may average the brightness values of a block of p by q (e.g. 2 by 2) pixels and assign an exposure quality value to the pixel block based on the average brightness. Both will result in an exposure quality map that is p by q times reduced as compared to the image itself. More generally, step S1 assigns an exposure quality value to each block of pixels (a block may be a single pixel) based on a brightness value of the block calculated from at least one pixel in the block. Each pixel of the exposure quality map corresponds to one pixel block of the image.

The next two steps (steps S2 and S3) are performed for each possible subset of M images of the set of N images. The number M of images in each subset is pre-determined, which includes being set by the user based on his preferences. For a set of N images, there are $[N*(N-1)* \ldots *(N-M+1)/M*(M-1) \ldots *1]$ possible subsets of M images. For example, for N=7 and M=3, there are 35 possible subsets.

In step S2, the M exposure quality maps for the M images in the subset, calculated in step S1, are combined using a max operation to generate a combined exposure quality map for the subset. For each pixel in the combined exposure quality map, its pixel value (an exposure quality value) is the maximum of the M pixel values for the corresponding pixels (i.e. same pixel location) in the M exposure quality maps. Here it is assumed that an exposure quality value corresponding to better exposure is numerically greater than an exposure quality value corresponding to poorer exposure. This is a matter of definition. More generally stated, for each pixel in the combined exposure quality map, its pixel value (an exposure quality value) is the one of the corresponding M pixel values of the M exposure quality maps that is the closest in value to the first exposure quality value.

In this step, it is not necessary to track which individual exposure quality map had the optimum pixel value that contributed to the combined exposure quality map at each pixel. The result of step S2 is one combined exposure quality map for each subset of images.

Figure 4:
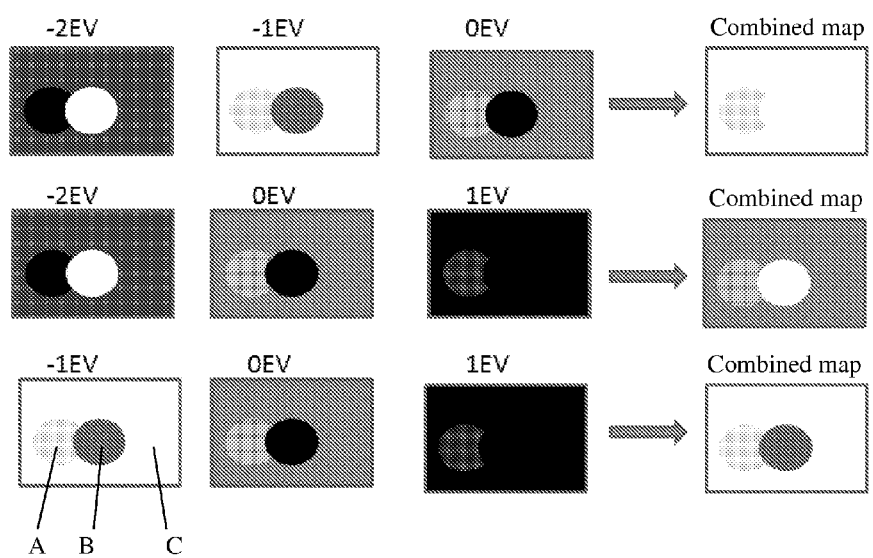
FIG. 4 schematically illustrates examples of combined exposure quality maps for several subsets calculated by a step of the subset selection method.

FIG. 4 shows some examples of the max operation for combining M exposure quality maps. In the first row, the subset consists of the −2EV, −1EV and 0EV images and their exposure quality maps are shown. The combined exposure quality map on the right of the first row has the first exposure quality values in region C due to contribution from the −1EV map, and has the first exposure quality values in region B due to contribution from the −2EV map; the map also has exposure quality values fairly close to the first exposure quality values in region A due to contribution from the −1EV map. Note that the examples shown in FIG. 4 do not include all possible subsets.

Next (step S3), an average pixel value of the combined exposure quality map of the subset is calculated using all pixels in the combined map. This average value represents the quality of that subset of images for purpose of generating an HDR image, and can be used as a quality score. Alternatively, other values calculated from all pixel values of the combined exposure quality map may be used as the quality score. One example is the median pixel value. Another example is a value (mean−α*standard deviation), where α is a positive constant. Stated more generally, the quality score is a value calculated from all pixels in the combined exposure quality map using a predefined equation.

In the examples shown in FIG. 4, the combined map of the first row will give the highest quality score among the three subsets shown.

In step S4, after the quality scores for all possible subsets of the image set are calculated, the subset having the highest quality score among all subsets is selected as the optimum subset of images for HDR image creation. In step S5, an HDR image is generated using the selected subset of images. Any suitable method for generating HDR images from multiple images, including currently known methods, may be used to implement step S5.

The method of selecting an optimum subset of images described here can be implemented in a data processing apparatus such as that shown in FIG. 5A. The data processing apparatus 120 may be a general purpose computer or the data processing section of a digital camera. The data processing apparatus 120 comprises a processor 121, a storage device (e.g. hard disk drive, EPROM, etc.) 122, and an internal memory (e.g. RAM) 123. The storage device 122 stores computer programs (software or firmware), which are read out to the RAM 123 and executed by the processor 121 to carry out the methods.

The method may also be implemented in hardwired circuits, such as one or more chips within a digital camera. FIG. 5B schematically illustrates a digital camera 130, which includes a processor 121, a storage device 132, and an internal memory 133, as well as an imaging section 134 for obtaining images and a control section 135 for controlling the various functions of the camera. The control section 135 may perform autobracketing to automatically take a set of N images at different exposure levels. Autobracketing is well known and its details are omitted here. The processor 131 may automatically select a subset of M images from the set of N images using the algorithm described above, and generate the HDR image.

In one aspect, the invention is embodied in a data processing apparatus, which may be the data processing section of a digital camera. In another aspect, the invention is a computer program product embodied in computer usable non-transitory medium having a computer readable program code embedded therein for controlling a data processing apparatus. In another aspect, the invention is a method carried out by a data processing apparatus.

It will be apparent to those skilled in the art that various modification and variations can be made in the image subset selection and HDR image creation method and related apparatus of the present invention without departing from the spirit or scope of the invention. Thus, it is intended that the present invention cover modifications and variations that come within the scope of the appended claims and their equivalents.

What is claimed is:

1. A method for generating a high dynamic range (HDR) image using a set of N images having different exposure levels, the method comprising:
   (a) generating, for each of the set of N images, an exposure quality map based on brightness levels of the pixels in the image, wherein the exposure quality map has pixels having exposure quality values calculated from the brightness levels of the pixels of the image;
   (b) calculating a quality score for each of a plurality of subset of M images of the set of N images, including:
      (b1) generating a combined exposure quality map from the exposure quality maps corresponding to the M images; and
      (b2) calculating the quality score from the combined exposure quality map based on the pixel values of the combined exposure quality map;
   (c) selecting one subset from the plurality of subsets of M images based on the calculated quality scores for the plurality of subsets; and
   (d) generating an HDR image using the selected subset of M images,
   wherein in step (a), the exposure quality map is generated by assigning, to each pixel block of the image, an exposure quality value based on a brightness value of the pixel block and an exposure quality function, wherein the exposure quality function maps brightness values within a center brightness range to more favorable exposure quality values, and maps brightness values outside of the center brightness range to less favorable exposure quality values.

2. The method of claim 1, wherein the more favorable exposure quality values are a first exposure quality value and the less favorable exposure quality values are between the first exposure quality value and a second exposure quality value.

3. The method of claim 1, wherein in step (b1), each pixel of the combined exposure quality map has an exposure quality value which equals a most favorable one among M exposure quality values of corresponding pixels in the M exposure quality maps.

4. The method of claim 1, wherein in step (b2), the quality score is calculated as an average exposure quality value of all pixels of the combined exposure quality map.

5. The method of claim 1, wherein the plurality of subsets of M images include all possible subsets of M images of the set of N images.

6. A digital camera comprising a data processing section executing the method of claim 1, the digital camera further comprising:
   an imaging section for obtaining images; and
   a control section for controlling the imaging section to obtain the set of N images having different exposure levels.

7. A method for generating a high dynamic range (HDR) image using a set of N images having different exposure levels, the method comprising:
   (a) calculating a quality score for each of a plurality of subsets of M images of the set of N images, including:
      (a1) assigning an exposure quality value to each pixel block of each of the M images based on a brightness value of the pixel block and an exposure quality function, wherein the exposure quality function maps brightness values within a center brightness range to more favorable exposure quality values, and maps brightness values outside of the center brightness range to less favorable exposure quality values; and
      (a2) calculating the quality score for each of the plurality of subsets of M images by evaluating the exposure quality value of all pixel blocks of all of the M images in the subset;
   (b) selecting one subset from the plurality of subsets of M images based on the calculated quality scores for the plurality of subsets; and
   (c) generating an HDR image using the selected subset of M images,
   wherein step (a1) generates an exposure quality map for each of the M images, each pixel of the exposure quality map corresponding to a block of the image, and wherein step (a2) comprises, for each of the plurality of subsets of M images,
   combining M exposure quality maps for the M images in the subset to generate a combined exposure quality map for the subset, wherein each pixel of the combined exposure quality map is assigned an exposure quality value which equals a most favorable one among M exposure quality values of corresponding pixels in the M exposure quality maps; and
   calculating the quality score of the subset from the exposure quality value of all pixels of the combined exposure quality map.

8. The method of claim 7, wherein the quality score of the subset calculated in step (a2) is an average exposure quality value of all pixels of the combined exposure quality map.

9. The method of claim 7, wherein the more favorable exposure quality values equal to a first exposure quality value and the less favorable exposure quality values are between the first exposure quality value and a second exposure quality value.

10. The method of claim 7, wherein the plurality of subsets of M images include all possible subsets of M images of the set of N images.

11. The method of claim 7, wherein each pixel block is a single pixel of the image.

12. A digital camera comprising a data processing section executing the method of claim 7, the digital camera further comprising:
   an imaging section for obtaining images; and
   a control section for controlling the imaging section to obtain the set of N images having different exposure levels.

13. A computer program product comprising a computer usable non-transitory medium having a computer readable program code embedded therein for controlling a data processing apparatus, the computer readable program code configured to cause the data processing apparatus to execute a process for generating a high dynamic range (HDR) image using a set of N images having different exposure levels, the process comprising:
   (a) generating, for each of the set of N images, an exposure quality map based on brightness levels of the pixels in the image, wherein the exposure quality map has pixels having exposure quality values calculated from the brightness levels of the pixels of the image;

(b) calculating a quality score for each of a plurality of subset of M images of the set of N images, including:

(b1) generating a combined exposure quality map from the exposure quality maps corresponding to the M images; and (b2) calculating the quality score from the combined exposure quality map based on the pixel values of the combined exposure quality map;

(c) selecting one subset from the plurality of subsets of M images based on the calculated quality scores for the plurality of subsets; and (d) generating an HDR image using the selected subset of M image, wherein in step (a), the exposure quality map is generated by assigning, to each pixel of the image, an exposure quality value based on the brightness value of the pixel and an exposure quality function, wherein the exposure quality function maps brightness values within a center brightness range to more favorable exposure quality values, and maps brightness values outside of the center brightness range to less favorable exposure quality values.

14. The computer program product of claim 13, wherein the more favorable exposure quality values are a first exposure quality value and the less favorable exposure quality values are between the first exposure quality value and a second exposure quality value.

15. The computer program product of claim 13, wherein in step (b1), each pixel of the combined exposure quality map has an exposure quality value which equals a most favorable one among M exposure quality values of corresponding pixels in the M exposure quality maps.

16. The computer program product of claim 13, wherein in step (b2), the quality score is calculated as an average exposure quality value of all pixels of the combined exposure quality map.

17. The computer program product of claim 13, wherein the plurality of subsets of M images include all possible subsets of M images of the set of N images.

* * * * *